(12) United States Patent
Vinshtok et al.

(10) Patent No.: US 9,518,848 B2
(45) Date of Patent: Dec. 13, 2016

(54) SENSOR HOUSING

(75) Inventors: Yevgeniy Vinshtok, Allentown, PA (US); Michael J. McGowan, Downington, PA (US); Peter Breh, West Chester, PA (US); Ralf Siegler, Schlier (DE); Michael Becker, Tettnang (DE)

(73) Assignee: IFM ELECTRONIC GMBH, Essen (DE)

( * ) Notice: Subject to any disclaimer, the term of this patent is extended or adjusted under 35 U.S.C. 154(b) by 999 days.

(21) Appl. No.: 11/871,971

(22) Filed: Oct. 12, 2007

(65) Prior Publication Data

US 2009/0169778 A1    Jul. 2, 2009

(51) Int. Cl.
*G01D 11/24*    (2006.01)

(52) U.S. Cl.
CPC ............ *G01D 11/245* (2013.01); *Y10T 428/13* (2015.01)

(58) Field of Classification Search
USPC .......................... 220/3.2, 3.3, 3.5, 3.94, 4.02
See application file for complete search history.

(56) References Cited

U.S. PATENT DOCUMENTS

| | | | |
|---|---|---|---|
| 3,572,120 A | 3/1971 | Lukas et al. | |
| 3,898,562 A | 8/1975 | Mizikar et al. | |
| 4,801,118 A * | 1/1989 | Wium | 248/300 |
| 4,896,784 A * | 1/1990 | Heath | 220/3.2 |
| 5,029,817 A * | 7/1991 | Tamm | 254/134.3 R |
| 5,306,870 A * | 4/1994 | Abat | 174/659 |
| D361,057 S * | 8/1995 | Fayfield | D13/165 |
| RE35,075 E * | 10/1995 | Lammens, Jr. | 220/3.2 |
| 5,700,977 A * | 12/1997 | Ford et al. | 174/64 |
| D401,910 S * | 12/1998 | Fooks et al. | D13/165 |
| 5,942,728 A * | 8/1999 | Chen | 174/652 |
| 6,069,317 A * | 5/2000 | Wagganer | 174/650 |
| D442,563 S * | 5/2001 | Fayfield | D13/165 |
| 6,371,313 B1 * | 4/2002 | Walter et al. | 211/123 |
| D470,462 S * | 2/2003 | Fayfield et al. | D13/165 |
| 6,527,302 B1 * | 3/2003 | Gault et al. | 285/125.1 |
| 6,737,575 B2 * | 5/2004 | Pyron | 174/50 |
| 6,737,580 B2 * | 5/2004 | Eaton et al. | 174/388 |
| 6,838,615 B2 * | 1/2005 | Pyron | 174/50 |
| 7,102,078 B2 * | 9/2006 | Weber et al. | 174/50 |
| 7,109,416 B1 * | 9/2006 | Reed | 174/50 |
| 7,186,913 B2 * | 3/2007 | Hull et al. | 174/50 |
| 7,446,266 B1 * | 11/2008 | Gretz | 174/481 |
| 7,484,711 B2 * | 2/2009 | Pyron | 254/134.3 FT |
| 7,504,580 B2 * | 3/2009 | Lammens et al. | 174/50 |
| 7,954,858 B2 * | 6/2011 | Pyron | 285/55 |
| 2005/0277932 A1 * | 12/2005 | Farris | 606/61 |
| 2007/0007498 A1 * | 1/2007 | Pyron | 254/134.3 FT |
| 2010/0284437 A1 | 11/2010 | Stoll et al. | |

FOREIGN PATENT DOCUMENTS

| | | |
|---|---|---|
| DE | 2517951 A1 | 11/1975 |
| DE | 2521147 A1 | 12/1975 |
| DE | 29522086 U1 | 8/1999 |
| DE | 10109095 A1 | 9/2002 |
| DE | 102007042789 A1 | 3/2009 |
| GB | 1494084 A | 12/1977 |
| JP | 8334119 A | 12/1996 |

* cited by examiner

*Primary Examiner* — Fenn Mathew
*Assistant Examiner* — Jennifer Castriotta
(74) *Attorney, Agent, or Firm* — Leydig, Voit & Mayer, Ltd.

(57) ABSTRACT

A sensor housing (1) includes a basic body (2) and two tube sections (4, 9) projecting from the basic body (2). At least a first one (4; 9) of the tube sections has an outside thread which is interrupted in circumferential direction by at least one recessed facet (15, 17; 19, 20). The facet (15, 17; 19, 20) extends—from a center plane of the first tube section (4; 9) being parallel to the longitudinal axis of the second tube section (9; 4)—on at least one side of this center plane essentially perpendicularly to it.

15 Claims, 3 Drawing Sheets

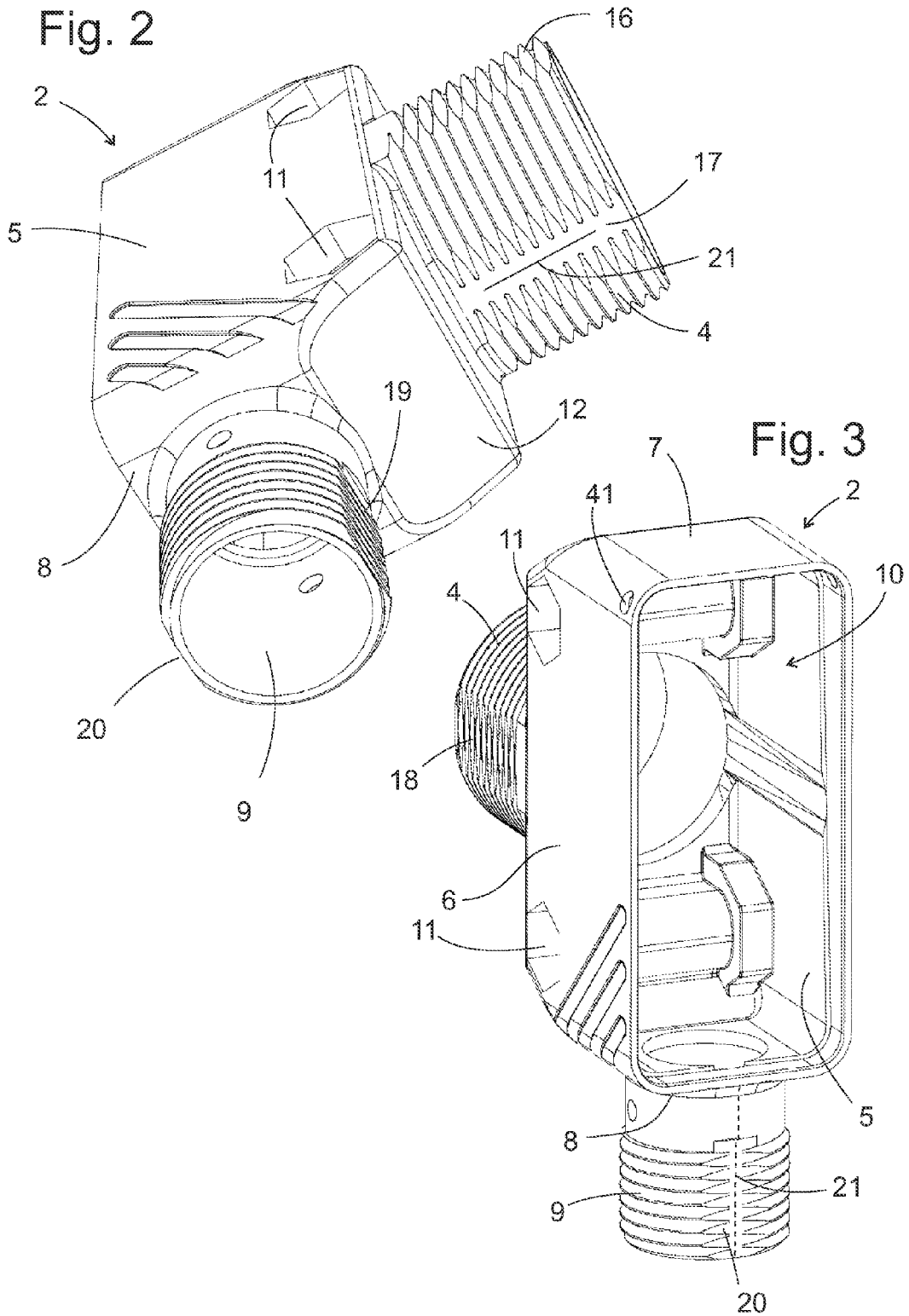

SENSOR HOUSING

Figure 1:
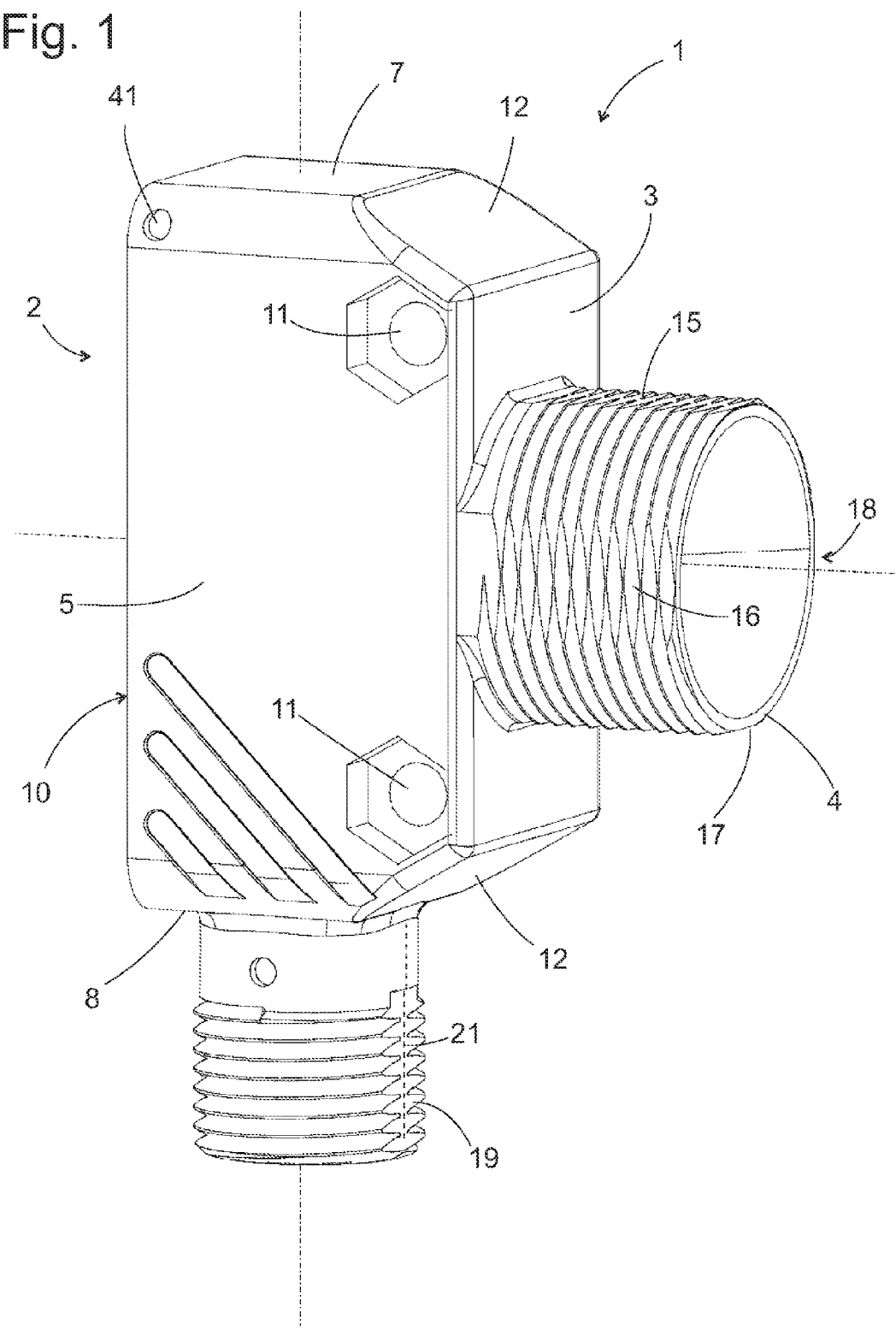

This invention relates to a sensor housing with a basic body and at least one tube section projecting from the basic body and bearing an outside thread which is interrupted in circumferential direction by at least one recessed facet. Such a sensor housing is known, e.g., from U.S. D 442 563 S or U.S. D 470 462 S.

In these known sensor housings, two facets each are provided diametrically opposed on the outside thread and pass over flush in two lateral surfaces of the approximately cuboid basic body. Between these two side walls, two passages extend on both sides of the tube section and are able to receive screws or the like for fastening the sensor housing on a carrier.

To economically manufacture such a housing by injection molding or die-casting, at least two molding tools are required which jointly mold the outside thread of the tube section. When they are to simultaneously mold the basic body's side walls—adjacent to the facets—with the passages, they must be movable against each other in a direction perpendicular to the facets or, respectively, parallel to the passages. The result thereof is that each of the two molds will each mold one half of an outside thread section extending between two facets. The molds must accordingly be very precisely matched to each other to prevent that, at the thread sections, molding seams are formed each corresponding to the boundary between the two molds and impairing the function of the thread. The molding seams cannot only make the thread tight; they also result in the gripping force of a screwed-on nut not being distributed over the circumference of the thread but being selectively introduced into the tube section at the molding seam. The resulting great strain of the tube section on the molding seam requires a large wall thickness which reduces the usable free cross-section of the tube section. This is irritating, in particular, when the tube section receives a sensor element or forms a window through which a sensor element provided in the basic body receives signals because the larger the window or the sensor element can be made, the higher the achievable sensitivity.

It is the objective of this invention to create a sensor housing of the above indicated type which, despite any possible molding seams on the tube section, enables a uniform force introduction distributed over the entire circumference of the thread.

According to a first inventive approach, the problem is solved by a sensor housing with a basic body and two tube sections projecting from the basic body, at least the first one of the two having an outside thread being interrupted in circumferential direction by at least one recessed facet, and the facet extends—from a center plane of the first tube section being parallel to the longitudinal axis of the second tube section—on at least one side of this center plane essentially perpendicularly to it. This enables the manufacture of the sensor housing with the aid of two molds which each meet the other at the level of the facet. If the two molds form a molding seam on the facet, any contact of the molding seam with an inside thread screwed onto the tube section can be largely prevented because the facet is recessed from the tube section. As outside and inside thread accordingly touch over a large area along the threaded sections engaging into each other, a uniform force introduction into the tube section is ensured, and local overstressing resulting in a damage of the tube section can be prevented with a small wall thickness of the tube section.

The facet preferably extends on both sides of the center plane; however, an embodiment is also taken into consideration in which two facets adjoin each other roof-like at the center plane.

A second approach according to the invention provides that the sensor housing comprises a basic body and at least one first tube section projecting from the basic body, that the tube section has an outside thread which, in circumferential direction, is interrupted by at least one recessed facet or by a plurality of recessed facets, and that a molding seam extending along the first tube section is surrounded on both sides by at least one of the facets.

According to a third approach, the sensor housing has a basic body through which at least one passage extends, and at least one first tube section projecting from the basic body and having an outside thread which is interrupted in circumferential direction by at least one recessed facet; and the facet extends in a direction which is parallel to the longitudinal direction of the passage or deviates from this longitudinal direction at best by a small angle facilitating the removal of the housing from the mold.

To exclude any contact between a molding seam and a screwed-on inside thread, the facet preferably intersects a core of the outside thread.

Preferably in the direction of the facet's surface normal, the basic body has a greater expansion than in a direction which is orthogonal to the surface normal and the longitudinal axis of the first tube section. This enables the use of molds with a favorable width/depth ratio.

The outside thread is preferably interrupted by recessed facets in at least two places diametrically opposed to each other.

The invention is particularly advantageously applicable if at least the first tube section, preferably the entire sensor housing, is made of metal. While, in the housing manufacture of plastic, on the one hand the stress of the molds is relatively low and molding seams at the boundary between the molds can be kept small for a long time and, on the other hand, any existing molding seams can be partly flattened due to the relatively low hardness of the material when it is tightly screwed whereby the contact surface between inside and outside thread is enlarged, in the case of metals which must be processed at substantially higher temperatures, the stress on the molds is substantially higher so that molding seams can develop within the course of the manufacturing operation due to the wear of the molds. Moreover, due to the greater hardness of the metals to be considered for sensor housings—as compared to the hardness of plastics—any deformation of the molding seams is minor when it is tightly screwed, and consequently the stress distribution imbalance along the circumference of the tube section is high in the presence of a molding seam. Accordingly, when metal is used instead of plastic for the tube section, it is conventionally not possible to reduce the wall thickness of the metallic tube section proportionately to the ratio of the tensile load capacities of metal and plastic. In contrast, small wall thicknesses of the tube section can be realized with the sensor housing according to the invention without the risk of rupture. The wall thickness can thus be reduced in the area of the facets to a value of under 0.7 mm, preferably even under 0.6 mm.

Since the thread is free of molding seams, extremely hard material can be used for the sensor housing or at least its first tube section; a hardness value of at least 380° Vickers is expedient or—as can be achieved in particular by using a metallic glass as the housing material—of at least 450° Vickers.

At least on the inside, the first tube section preferably has a surface roughness of less than Rz=6.3 μm. When metallic glass is used as the housing material, such a low roughness value and even values of under 4.0 μm can be achieved directly upon removal from the mold, without re-machining.

To realize a high effective aperture for a sensor element provided in the sensor housing, the first tube section preferably has a circular free inside cross-section. A relatively small wall thickness of the tube section resulting thereby in the area of the facets can be accepted, on the one hand, since the tensile load of the tube section upon screwing tightly is particularly low in the area of the facets and, on the other hand, since the preferably used hard housing material generally enables a small wall thickness of the tube section.

The round inside cross-section of the first tube section is, in particular, also advantageous when the first tube section receives an insert part and a sealing ring is jammed between the first tube section and the insert part.

To install a sensor element and/or analysis electronics in the sensor housing, the basic body preferably has an open rear side which can be closed by a cover mounted on the basic body. This cover can consist of the same material as the basic body; since the mechanical strain of the cover is, as a rule, lower than that of the tube section, a reasonably priced plastic material may also be used for the cover.

According to a preferred embodiment, the cover bears a wall which, in closed position of the cover, engages in the basic body and has an opening aligning with one of the tube sections. The cover on the basic body can thus be interlocked when a body, e.g. a plug-in connector part, is inserted into the tube section and the opening.

Figure 4:
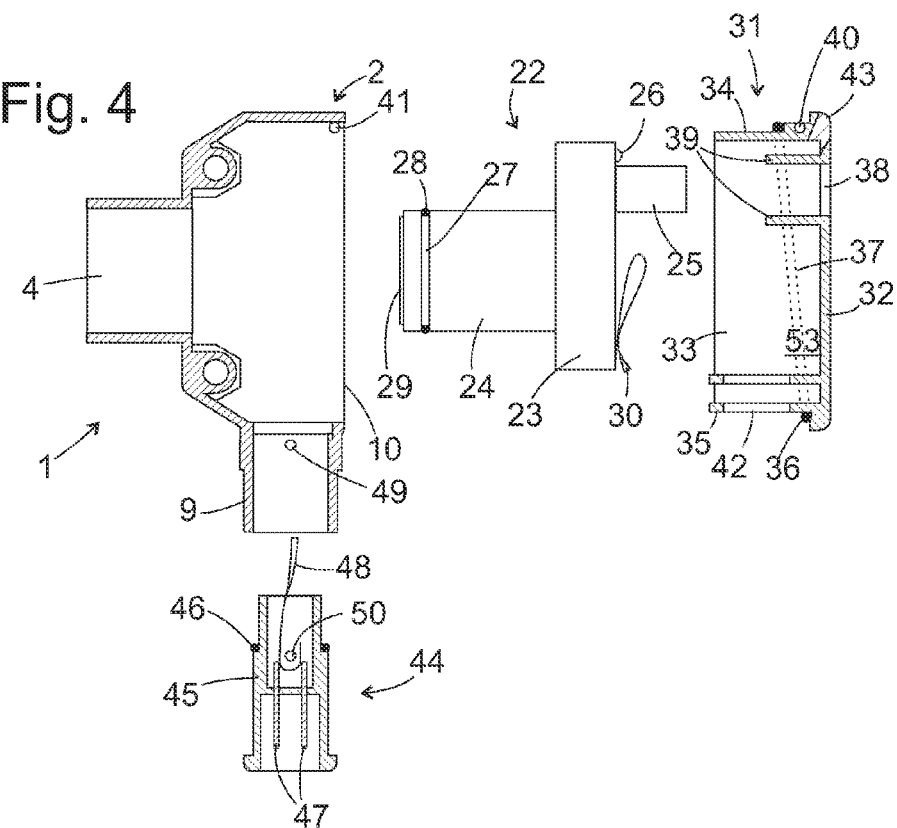
Figure 5:
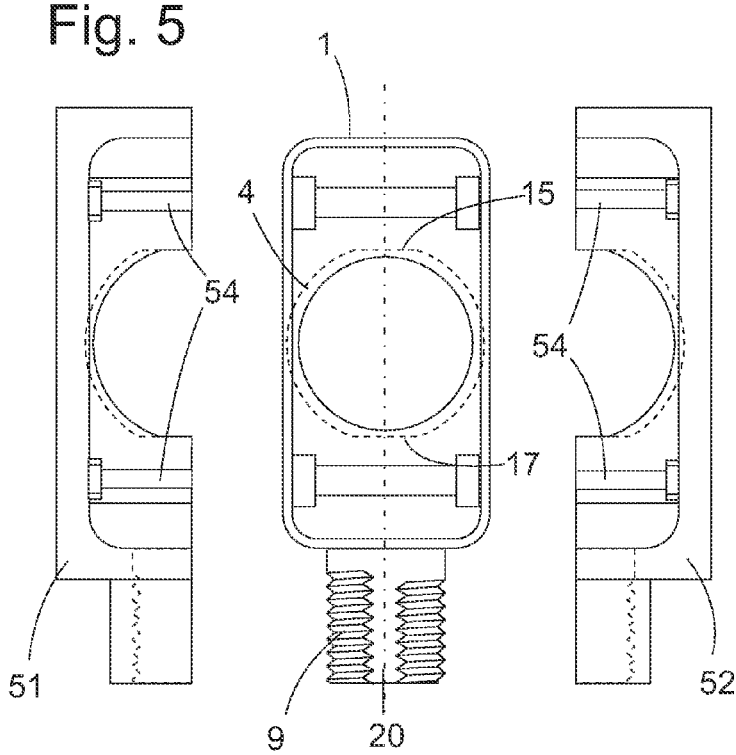
Figure 6:
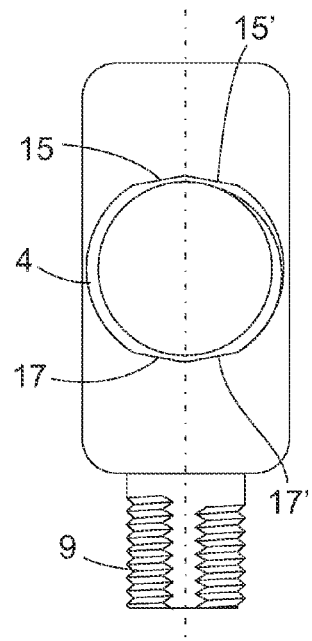

Further features and advantages of the invention will be apparent from the following description of exemplary embodiments, which refers to the enclosed figures. In the figures FIGS. 1, 2 and 3 each show perspective views of a sensor housing according to the invention;

FIG. 4 shows an exploded section through the sensor housing, a sensor component intended for installation in the sensor housing, a cover, and a plug-in connector jack in an exploded view;

FIG. 5 a top view on the sensor housing and two molding elements used for its manufacture; and FIG. 6 a top view on the sensor housing according to a modified embodiment.

FIGS. 1 to 3 are each perspective views of one and the same sensor housing 1. The sensor housing 1 has an essentially cuboid basic body 2 with a front wall 3 from which centrally projects a tube section with outside thread, hereinafter also called threaded stub 4, longitudinal walls 5, 6 and transverse walls 7, 8, one of which—8—has a second threaded stub 9 whose diameter is smaller than that of threaded stub 4. One rear side 10 of the basic body 2 facing the front wall 3 is open. Two openings 11 for fastening screws extend above and below the threaded stub 4 between the longitudinal walls 5, 6. Deviating from an exact cuboid form of the basic body 2, two inclined facets 12 connect the front wall 3 with the transverse walls 7, 8.

On the outer circumference of the threaded stub 4 and at an angular distance of 90°, four planar facets 15 to 18 are formed, with the facets 15, 17 standing perpendicularly on one symmetry plane of the basic body 2 set by the longitudinal axes of the threaded studs 4, 9, and the facets 16, 18 extending parallel to it.

The threaded stub 9 comprises facets 19, 20 which are perpendicular to the symmetry plane. As to be seen, in particular, in a comparison of FIGS. 1 and 2, the facets 16, 18 parallel to the symmetry plane do not extend into the thread core of the threaded stub so that they consist of a plurality of individual planar surfaces on the individual teeth of the thread, whereas the facets 15, 17, 19, perpendicular to the symmetry plane each extend into the thread core and thus form a planar surface continuously extending over the entire length of the threaded stub 4 or 9, respectively. Any molding seam 21 possibly extending on the facets 15, 17, 19, 20 due to a manufacturing inaccuracy can thus hardly come into contact with the inside thread of a nut (not shown) screwed onto the threaded stub 4 or 9, so that the thread teeth of threaded stub and nut engaging with each other will contact each other on a large surface, and the forces occurring on the thread are thus transmitted in a uniformly distributed way into the threaded stubs 4, 9.

FIG. 4 shows diagrammatically the structure of a complete sensor with the housing 1 shown in FIGS. 1 to 3. The housing 1 is provided to accommodate a sensor component 22 which here carries an approximately cuboid basic module 23, a cylindrical section 24 engaging in the threaded stub 4, as well as—on the rear side of the basis module 23 facing away from the cylindrical section—switches 25 and operating status indicator elements such as light-emitting diodes 26 for instance. At its end facing away from the basic module 23, the cylindrical section 24 has a circumferential groove 27 in which an O-ring 28 is accommodated. When the cylindrical section 24 is introduced into the threaded stub 4, the O-ring 28 seals on the inside area of the threaded stub 4.

The front face of the cylindrical section 24 is formed by a translucent window 29 behind which a photo diode is provided as a sensor element on the inside of section 24. Additionally, a light source, such as a light-emitting diode for instance, may be provided in the section 24 and emitting through the window 29 to the outside so that the photo diode detects light reflected from an object in front of the window 29. Of course, any other sensor elements such as capacitive or inductive proximity sensors for instance can be provided as sensor elements in the section 24; in this case, the housing up to the section 24 expediently consists of a dielectric or a non-ferromagnetic metal.

Signal and supply connections of the sensor component 22 extend on a flexible printed circuit board strip 30.

A cover 31 formed of plastic essentially comprises a plate 32 covering the open rear side 10 of the housing 1 and circumferential walls 33, 34, 35, extending along the walls of the plate 32. A window 38 in the plate 32 is limited by ribs 39 engaging between the walls 33. An opening 42 is formed in the lower wall 35. The lower wall 35 and one of the ribs 39 delimit a niche 53.

A shoulder 37 supporting a sealing ring 36 extends along the walls 33, 34, 35 in a plane oriented at an acute angle to the plate 32. The inclined orientation of the shoulder 35 allows to clip the cover 31 with the plate 32 oriented parallel to the rear side 10 onto the sensor housing 1 since the sealing ring 34 need not be pressed in over its entire length simultaneously between the walls 33, 34, 35 of the cover 31 and the walls 5 to 8 of the sensor housing 1.

When the cover 31 is pressed up to the stop onto the sensor housing 1, the ribs 39 touch the rear side of the basic module and thus fix it in position in the housing 1. The printed circuit board strip 30 is accommodated in the niche 53. A groove 40 of the cover 31 is in alignment with holes 41 in the longitudinal walls 5, 6 neighboring the transverse wall 7; and the opening 42 in the lower wall 35 is in alignment with the threaded stub 9. The switches 25 are inserted in the window 38 of the cover 31 and can be operated from the outside. The light-emitting diodes 26 are provided opposite a gap between the upper wall 34 and one of the ribs 39 so that they can illuminate a transparent insert 43 which forms an upper edge of the plate 32. An operating condition indicated by the light-emitting diodes 26 can thus be read off on the outside of the sensor housing 1.

A plug-in connector part 44 provided for insertion into the threaded stub 9 comprises an essentially cylindrical plastic body 45 which bears a sealing ring 46 on a shoulder and into which contact pins 47 are inserted. The contact pins 47 are connected with conductors of a flexible printed circuit board strip 48.

After the assembly of housing 1, sensor element 22 and cover 31, the free end of the printed circuit board strip 30 is first pulled out through the opening 42 and the threaded stub 9 and then contacted with the printed circuit board strip 48. Subsequently, the plastic body 45 is inserted into the threaded stub 9 with the sealing ring 46 sealing on the inside of the threaded stub 9. The plastic body 45 here engages into the opening 42 of the wall 35 of the cover 31 and interlocks it.

Complete interlocking and fixation of the cover 31 is achieved by inserting pins (not shown) through the holes 41 of the sensor housing 1 into the groove 40 of the cover 31. For fixation of the plastic body 45, short bolts can, moreover, be pressed into holes 49 of the threaded stub 9 and depressions 50 of the plastic body 45 which are aligned with them.

FIG. 5 illustrates diagrammatically the manufacture of the sensor housing 1. The sensor housing 1 is seen in a top view onto its open rear side; to the right and left thereof, two parts 51, 52 of a mold used for manufacture are to be seen. The pins 54 forming the passages 11 determine the direction of movement of the molded parts 51, 52 upon removal of the mold. The mold parts 51, 52 touch each other during molding along the symmetry plane of the basic body 2 so that molding seams can develop on the threaded stubs 4, 9 only in this symmetry plane, on the facets 15, 17, 19, 20.

For molding the sensor housing 1, alloys on the basis of zirconium and titanium are used which are sold by Liquidmetal Technologies, Inc., Lake Forest, Calif., U.S.A. under the designations of Liquidmetal I Alloy and Liquidmetal II Alloy. When heated, these alloys have the special feature of forming a melt of a temperature-dependent viscosity and, when cooled down sufficiently fast, an amorphous solid body of great hardness is formed from the melt. The amorphous, glassy nature of the solid body results in the molded housing being virtually free from the crystallization-specific grainy surface structure typical for metal castings, so that the finished molded body can be removed from the mold with a surface roughness of less than Rz=4.0 μm. When these alloys are used, a wall thickness of 0.5 mm is sufficient for the walls 5 to 8 of the basic body 2, with the edge lengths of the walls between 15 and 50 mm. At their thinnest point, the facets 15, 17, 19, 20 each have a wall thickness of 0.55 mm or less.

FIG. 6 shows a top view onto the front wall 3 of a sensor housing in accordance with a slightly modified embodiment of the invention. In this modification, facets 15, 15' or, respectively, 17, 17' are each molded on the threaded stub 4 on both sides of the symmetry plane and meet at a very obtuse angle at the symmetry plane. The facets 15, 17 are molded by a same molded part, the facets 15', 17' by another. The non-parallelism of the facets 15 and 17 or, respectively, 15' and 17' facilitates the removal of the finished housing from the mold; otherwise, this embodiment essentially has the same effects and advantages as the one described with reference to the FIGS. 1 to 5.

The invention claimed is:

1. A sensor housing comprising:
a basic body; and
at least a first tube section projecting from the basic body, the first tube section having an outside thread that is interrupted in a circumferential direction by a recessed facet,
wherein the sensor housing is formed from halves that are molded and connected to each other along a molding seam such that the facet extends on each side of the molding seam along the first tube section in a longitudinal direction thereof.

2. The sensor housing according to claim 1, wherein two facets adjoin each other in a roof-like manner at the molding seam.

3. The sensor housing according to claim 1, further comprising a second tube section projecting from the basic body in a direction orthogonal to the longitudinal direction of the first tube section.

4. The sensor housing according to claim 3, wherein the second tube section has an outside thread interrupted by at least one facet that extends along and across the molding seam.

5. The sensor housing according to claim 1, wherein the facet intersects a core of the outside thread.

6. The sensor housing according to claim 1, wherein the basic body has, in a direction of a surface normal of the facet, a greater expansion than in a direction which is orthogonal to the surface normal and the longitudinal axis of the first tube section.

7. The sensor housing according to claim 1, wherein the outside thread of the first tube section is interrupted in the circumferential direction by at least two places diametrically opposed recessed facets disposed along and extending across the molding seam.

8. The sensor housing according to claim 1, wherein the first tube section is made of a metallic glass.

9. The sensor housing according to claim 1, wherein the sensor housing has a wall thickness of under 0.7 mm.

10. The sensor housing according to claim 1, wherein the first tube section has a hardness of at least 380 degree Vickers.

11. The sensor housing according to claim 1, wherein the first tube section has, at least on an inside surface, a surface roughness of less than Rz=6.3 μm.

12. The sensor housing according to claim 1, wherein the first tube section has a circular hollow inside cross-section.

13. The sensor housing according to claim 1, wherein the first tube section is configured to receive an insert part with a sealing ring disposed between the first tube section and the insert part.

14. The sensor housing according to claim 1, further comprising a cover disposed over an open rear side of the basic body.

15. The sensor housing according to claim 14, wherein the cover includes a wall that engages in the basic body and includes an opening aligned with the first tube section.

* * * * *